United States Patent
Coz et al.

(10) Patent No.: US 10,193,171 B2
(45) Date of Patent: Jan. 29, 2019

(54) FUEL CELL WITH INTEGRATED WATER MANAGEMENT LAYER AND FABRICATION METHOD THEREOF

(71) Applicant: COMMISSARIAT À L'ENERGIE ATOMIQUE ET AUX ENERGIES ALTERNATIVES, Paris (FR)

(72) Inventors: Erwan Coz, Grenoble (FR); Jessica Thery, Saint Jean de Moirans (FR); Vincent Faucheux, Lans en Vercors (FR); Philippe Capron, Virieu sur Bourbre (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 7 days.

(21) Appl. No.: 15/241,251

(22) Filed: Aug. 19, 2016

(65) Prior Publication Data

US 2017/0054165 A1    Feb. 23, 2017

(30) Foreign Application Priority Data

Aug. 19, 2015 (FR) ...................... 15 57805

(51) Int. Cl.
| | | |
|---|---|---|
| *H01M 8/04291* | (2016.01) | |
| *H01M 4/86* | (2006.01) | |
| *H01M 4/88* | (2006.01) | |
| *H01M 8/1004* | (2016.01) | |
| *H01M 8/0245* | (2016.01) | |
| *H01M 8/1018* | (2016.01) | |

(52) U.S. Cl.
CPC ..... *H01M 8/04291* (2013.01); *H01M 4/8605* (2013.01); *H01M 4/8657* (2013.01); *H01M 4/8878* (2013.01); *H01M 8/0245* (2013.01); *H01M 8/1004* (2013.01); *H01M 2008/1095* (2013.01); *Y02P 70/56* (2015.11)

(58) Field of Classification Search
CPC ........... H01M 8/04291; H01M 4/8878; H01M 4/8657; H01M 4/8605; H01M 8/1004; H01M 8/0245; H01M 2008/1095; Y02P 70/56

See application file for complete search history.

(56) References Cited

U.S. PATENT DOCUMENTS

| | | | |
|---|---|---|---|
| 4,605,602 A * | 8/1986 | Feigenbaum | H01M 8/0297 429/468 |
| 5,575,012 A | 11/1996 | Fox et al. | |
| 6,489,051 B1 * | 12/2002 | Inoue | D21H 13/50 429/492 |
| 2005/0084742 A1 | 4/2005 | Angelopoulos et al. | |
| 2006/0078784 A1 | 4/2006 | Liu et al. | |
| 2008/0280188 A1 | 11/2008 | Eun et al. | |
| 2010/0009231 A1 * | 1/2010 | Kim | H01M 8/0206 429/437 |
| 2014/0038075 A1 | 2/2014 | Roberts et al. | |

FOREIGN PATENT DOCUMENTS

| | | |
|---|---|---|
| EP | 0 369 466 A2 | 5/1990 |
| WO | 99/62993 A1 | 12/1999 |

* cited by examiner

*Primary Examiner* — Muhammad S Siddiquee

(74) *Attorney, Agent, or Firm* — Oliff PLC

(57) ABSTRACT

Fabrication method of a fuel cell comprising the following successive steps:
   providing a substrate comprising:
       at least one membrane-electrode assembly, formed by an electrolytic membrane arranged between a first electrode and a second electrode,
       a first current collector arranged on the first electrode,
   depositing a fluoropolymer solution on the first current collector,
   making the solvent of the solution evaporate so as to form a porous thin layer of fluoropolymer.

13 Claims, 3 Drawing Sheets

US 10,193,171 B2

FUEL CELL WITH INTEGRATED WATER MANAGEMENT LAYER AND FABRICATION METHOD THEREOF

BACKGROUND OF THE INVENTION

The invention relates to water management in fuel cells, and more particularly in proton exchange membrane fuel cells.

STATE OF THE ART

A proton exchange membrane fuel cell (PEMFC) is an electric generator operating at low temperature (at temperatures of less than 100° C.), which produces electricity, water and heat by electrochemical combustion of hydrogen and oxygen.

Water is formed, when the cell is in operation, at the level of the cathode according to the half-equation:

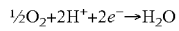

$$\tfrac{1}{2}O_2 + 2H^+ + 2e^- \rightarrow H_2O$$

It is essential to be able not only to allow oxygen input but also to remove the water produced at the level of the cathode.

To enhance water management at the level of the cathode, it is for example possible to add porous conducting materials such as carbon cloths or papers at the level of the current collector.

However, this type of material is costly. In addition, it is not suitable for a planar architecture presenting several interconnected adjacent unitary cells. The conducting material in contact with the different cells, and more particularly with the different current collectors, can in fact cause a short-circuit.

Instead of the conducting material, it is also possible to use an insulating and hydrophobic material.

For example, in the document US 2014/0038075, it is indicated that the cathodes can be protected from drying-out or from excess moisture by depositing a hydrophobic layer on the surface of the fuel cell. The hydrophobic layer can be a porous layer of polytetrafluoroethylene.

The document US 2008/0280188 also describes a filter made from hydrophobic material 30, positioned between the cathodic current collector 20 and the cathodic end plate 40 (FIG. 1).

The filter is configured to allow air flow to the cathode and to limit moisture removal to prevent the membrane 12 and/or cathode 14 from drying-out when the cell is operating. The filter can be made from Teflon®. The filter is porous, the size of the pores ranging from 5 μm to 20 μm. It is indicated that if the size of the pores is smaller than 5 μm, moisture removal is inhibited. If the size of the pores is larger than 20 μm, a large quantity of moisture is removed, which may lead to drying-out of the membrane.

OBJECT OF INVENTION

The object of invention is to remedy the shortcomings of the prior art, and in particular to propose a fuel cell presenting improved electrochemical performances.

This object is achieved by a fabrication method of a fuel cell comprising the following successive steps:
providing a substrate comprising:
at least one membrane-electrode assembly, formed by an electrolytic membrane arranged between a first electrode and a second electrode,
a first current collector arranged on the first electrode,
depositing a fluoropolymer solution on the first current collector,
making the solvent of the solution evaporate so as to form a porous thin layer of fluoropolymer.

This object is also achieved by a fuel cell comprising:
at least one membrane-electrode assembly formed by an electrolytic membrane arranged between a first electrode and a second electrode,
a first current collector arranged on the first electrode,
a porous thin layer of fluoropolymer covering the first current collector, said porous thin layer of fluoropolymer being formed by fluoropolymer particles having a diameter ranging from 150 nm to 350 nm.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF A PREFERRED EMBODIMENT OF THE INVENTION

The method for producing a fuel cell, and more particularly a proton exchange membrane fuel cell, comprises the following successive steps:
providing a substrate comprising:
at least one membrane-electrode assembly (MEA) 1, formed by an electrolytic membrane arranged between a first electrode and a second electrode,
a first current collector 2 arranged on the first electrode,
forming a porous thin layer of fluoropolymer 3 on the first current collector 2.

Figure 1:
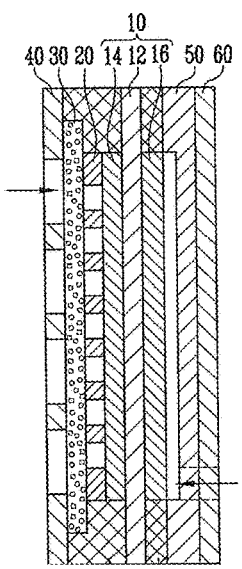
FIG. 1 represents a fuel cell according to the prior art, in schematic manner, in cross-section.
Figure 2:
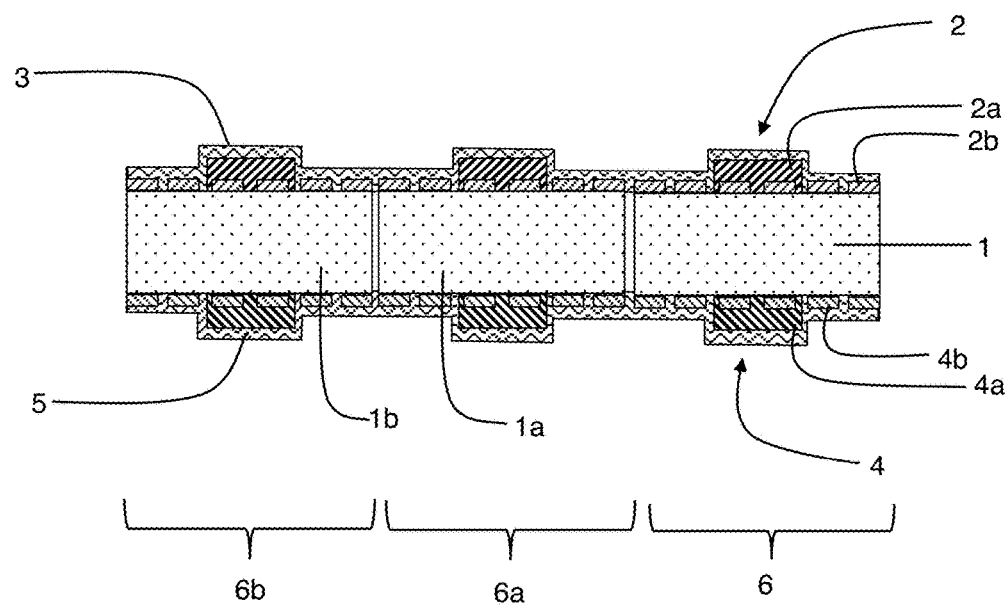
FIG. 2 represents a fuel cell according to an embodiment of the invention, in schematic manner and in cross-section.

As represented in FIG. 2, a MEA 1 comprises a membrane associated with a first electrode and with a second electrode.

The membrane of a MEA can be essentially formed by a material of perfluoropolymer or polyimide or polyether type, such as the material marketed by the DuPont company under the brandname Nation®.

The first and second electrodes are designed to form the cathode and the anode of the MEA 1. The first and second electrodes each comprise a diffusion layer and a catalyst.

The first electrode is preferentially the cathode and the second electrode the anode.

According to another embodiment, the first electrode could be the anode.

The porous thin layer of fluoropolymer 3 is hydrophobic. What is meant by hydrophobic is when a water droplet is deposited on the layer, the contact angle is strictly greater than 90°.

This layer is a water management layer. The hydrophobic layer ensures the equilibrium between water retention, necessary for a good hydration of the membrane, and water removal.

Deposition of a porous thin layer of fluoropolymer 3 can be performed by means of different methods.

For example, International application WO 99/62993 describes a preparation method of a porous thin layer of polytetrafluoroethylene (PTFE) by fusion of PTFE particles. The porous layers obtained present thicknesses comprised between 50 µm and 2000 µm. They are used in gas filters or to filter liquids. The method requires the devices to be heated to temperatures of about 345-355° C. The porous PTFE thin films can also be achieved by depositing an aqueous dispersion containing polymerized PTFE particles on a substrate (EP0369466). The solution has a mass concentration comprised between 0.1% and 25%. After drying and sintering at a temperature comprised between 330° C. and 380° C., a porous film is obtained. The films are fabricated for the purposes of producing sensors.

However, the fabrication conditions of these materials (temperature, method) are not compatible with direct integration on a fuel cell.

The porous thin layer of fluoropolymer 3 is produced by means of the following steps:
depositing a fluoropolymer solution on the first current collector 2,
making the solvent of the solution evaporate so as to form a porous thin layer of fluoropolymer 3.

With such a deposition, the thin layer of fluoropolymer 3 is in direct contact with the first current collector 2. There is very little or no space between the current collector and the thin layer. This compact architecture prevents the creation of preferential condensation areas close to the current collectors. The performances of the cell are improved.

The fluoropolymer solution can be deposited by coating or by vacuum deposition. Preferentially, the fluoropolymer solution is deposited by screen-printing, by inkjet, or by spraying.

Deposition by spraying is performed by driving of the solution by a vector gas under pressure, such as air, nitrogen or argon for example, through a nozzle. Fine droplets of liquid are injected and deposit on the substrate, forming a layer of material after evaporation of the solvent, i.e. after drying.

Advantageously, drying of a thin layer deposited by spraying is very fast. In the case of a vacuum deposition, no drying step is necessary.

Deposition of the fluoropolymer solution is performed at a temperature of less than 130° C. and advantageously comprised between 100° C. and 130° C. Drying will be facilitated and the deposition will be more homogenous.

Advantageously, at least the substrate is at a temperature between 100° C. and 130° C. when deposition is performed. To obtain such a temperature, the substrate can for example be placed on a heating plate.

According to an alternative embodiment, the substrate could be positioned in a heated deposition chamber or, according to another embodiment, the deposition could be performed under vacuum.

After deposition of the solution, the solvent is evaporated so as to form a solid thin layer. After evaporation of the solvent, the thin layer 3 is secured to the current collector.

The solvent is advantageously evaporated at a temperature of less than 150° C. in order not to damage the MEA.

The fabrication method of the porous thin layer 3 does not require any sintering or high-temperature annealing step. What is meant by high temperature are temperatures of more than 150° C. Advantageously, the whole method is performed at a temperature of less than 130° C.

The fluoropolymer solution is deposited on the first current collector 2. Advantageously, at least one area of the first electrode is not covered by the first current collector 2: the solution can be deposited simultaneously on the first current collector 2 and on the first electrode 2. A single deposition enables the first electrode and first current collector 2 to be simultaneously covered by a porous thin layer of fluoropolymer.

The porous thin layer 3 is then in direct contact with the first electrode, which prevents the formation of privileged condensation areas.

During operation of the cell, the immediate proximity between the water formation region and the first electrode advantageously prevents condensation and nucleation of water droplets close to the electrode, which improves the electrochemical properties of the fuel cell.

Preferentially, the first current collector 2 comprises a plurality of transverse passages designed to enable flow of a fluid to the first electrode. Hydrogen can thus pass through the transverse passages in the case of an anodic current collector and oxygen can pass through the transverse passages in the case of a cathodic current collector.

Advantageously, the water produced during operation of the fuel cell is removed via the same transverse passages.

Advantageously, the porous thin layer of fluoropolymer 3 is formed by depositing a fluoropolymer solution simultaneously on the first current collector 2 and on the first electrode.

According to a first embodiment, the first current collector 2 can be structured in the form of a comb.

According to another embodiment, the first current collector can also be uniformly porous or it can comprise an alternation of porous areas and non-porous areas, the pores in both cases acting as transverse passages of the current collectors.

Preferentially, the first current collector 2 comprises at least one solid area 2a and a porous area 2b. The porous area is for example formed by a porous metal.

According to another alternative, the first current collector 2 could be formed by a single porous area 2b.

When the thin layer of fluoropolymer 3 is formed on a porous area 2b, it becomes easier to obtain a porous thin layer.

The fuel cell comprises a second current collector 4 arranged on the second electrode. The second current collector 4 advantageously presents the same structure as the first current collector.

As represented in FIG. 2, the first current collector 2 and second current collector 4 are preferentially formed by a solid area 2a, 4a and a porous area 2b, 4b.

According to a particular embodiment of the invention, a second porous thin layer of fluoropolymer 5 is formed on the second current collector 4 and the second electrode.

Advantageously, the presence of a hydrophobic porous layer 5 on the anode limits flow-back to the anode and therefore enables the water transfer to be balanced.

According to another embodiment, porous thin layers 3, 5 are formed on the first current collector 2 and second current collector 4. Advantageously, flow-back to the anode is limited, and at the same time the water transfer between the anode and the cathode is balanced.

The current collectors 2, 4 are advantageously made from metal. They can be current collectors made from carbon, gold, platinum, silver or any other conducting metal.

The current collectors 2, 4 are produced by means of any type of known method for fabricating thin layers. They can in particular be fabricated by Physical Vapour Deposition (PVD), by Chemical Vapour Deposition (CVD), by screen-printing or by electrochemical deposition.

The fluoropolymer solution deposited on the current collectors 2, 4 is a fluoropolymer solution polymerised by emulsion and diluted in water. Advantageously, the water is deionised water.

The fluoropolymer solution has a mass concentration comprised between 10% and 60%.

Drying will be quicker the higher the concentration, but the thickness of the deposited layer and the resulting stresses also increase, which may lead to a deposition with cracks, presenting less good adhesion properties.

Preferentially, the mass concentration is comprised between 20% and 40%. With such percentages, the mechanical strength of the deposition is improved while at the same time enabling quick drying.

Preferentially, the fluoropolymer is chosen from polytetrafluoroethylene, fluorinated ethylene propylene, ethylene tetrafluoroethylene and perfluoroalkoxy.

According to a particular embodiment, hydrophilic charges are added to the solution to reduce the hydrophobic nature of the final material. Making the porous thin layer more hydrophilic is particularly advantageous when the fuel cell operates at higher temperature (for example above 60° C.). A more hydrophilic material will retain the moisture better and will enable a better hydration of the membrane. This can for example involve reducing the hydrophobicity so as to have a contact angle of 120° instead of 140°.

However, even by adding hydrophilic charges, the material will advantageously remain hydrophobic.

The hydrophilic charges are preferentially oxide nanoparticles. For example, $SiO_2$, $TiO_2$, $Al_2O_3$ or carbon nanoparticles can be used.

The fluoropolymer porous thin layer 3, obtained by means of the fabrication method and covering the current collector, is formed by fluoropolymer particles having a diameter ranging from 150 nm to 10 µm, and preferably ranging from 150 nm to 350 nm.

Figure 3:
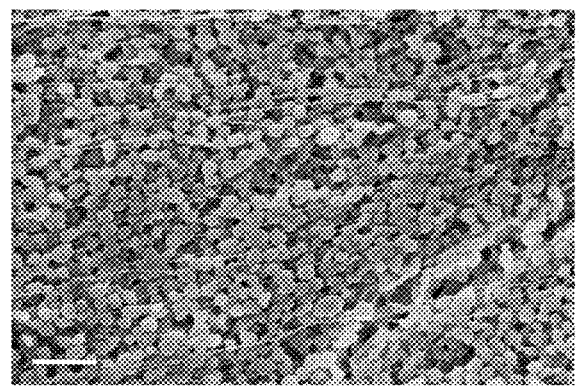
FIG. 3 represents a snapshot obtained by scanning electron microscope of a porous thin layer of PTFE, in top view, according to a particular embodiment of the invention; the scale represents 1 μm.

The fluoropolymer particles are bonded to one another by fluoropolymer wires having a length ranging from 1 µm to 10 µM (see FIG. 3).

The fluoropolymer wires present a diameter of less than 100 nm. Advantageously, the wires ensure the cohesion of the thin layer.

The pores of the porous thin layer of fluoropolymer 3 advantageously present dimensions ranging from 100 nm to 1 µm.

Pores of small dimensions facilitate expulsion of water in vapour form while at the same time preventing the water from returning in liquid form.

The porous thin layer of fluoropolymer has a thickness ranging from 0.1 µm to 10 µm.

Alternatively, several thin layers of fluoropolymer can be successively deposited so as to form a thin layer with a thickness of more than 10 µM.

Advantageously, when several layers are deposited, a drying time comprised between 1 second and 1 minute will be maintained between two successive depositions.

A mask can also be used to form a hydrophobic layer presenting different thicknesses in the same plane.

Advantageously, different thicknesses and/or several depositions are performed when, in a fuel cell, hotter areas require a greater water retention.

The maximum thickness of the final porous thin layer is advantageously less than 100 µm, and even more preferentially less than 50 µm.

In the case of successive depositions, it is possible to produce a first porous thin layer comprising particles having a diameter of about 300 nm, and to then produce a second porous thin layer with particles of larger dimensions, for example with particles having a diameter comprised between 1 µm and 10 µM.

Once the porous thin layer of fluoropolymer has been deposited, as illustrated in FIG. 2, the fuel cell comprises:
  a membrane-electrode 1 assembly, formed by an electrolytic membrane arranged between a first electrode and a second electrode,
  a first current collector 2 arranged on the first electrode,
  a second current collector 4 arranged on the second electrode,
  a porous thin layer 3 of fluoropolymer covering the first current collector 2,
  and, possibly, a porous thin layer of fluoropolymer 5 covering the second current collector 4.

What is meant by "covering" is that the first current collector 2 is secured to the porous thin layer of fluoropolymer 3. These elements are in physical contact.

The same is the case for the second current collector 4 and the porous thin layer of fluoropolymer 5.

The fuel cell is advantageously a fuel cell of planar type.

As represented in FIG. 2, in a planar architecture, several elementary cells 6, 6a and 6b (also called unitary cells) are electrically associated to one another.

The elementary cells can be electrically connected in parallel to be able to deliver a high current and/or in series to increase the voltage available at the terminals of the fuel cell.

In FIG. 2, each elementary cell 6, 6a and 6b comprises a MEA, respectively 1, 1a and 1b, each MEA being provided with a membrane independent from the other cells. According to another alternative, the different elementary cells 6, 6a and 6b could share a common membrane.

Each MEA is provided with a first current collector and with a second current collector.

The method enables the hydrophobic porous thin layer to be deposited simultaneously on the different current collectors located at the level of one and the same surface of the device.

Advantageously, the presence of one or more porous layers of fluoropolymer in such a planar architecture considerably reduces drying-out of the membrane and at the same time prevents excessive wetting of the membrane, during the operating and stopping cycles of the fuel cell.

Once it has been produced, the planar fuel cell is integrated in a cover to enable connection with the fuel. The add-on cover, which is generally sealed to the cell, is formed by an inert material and ensures the tightness of the system.

The fabrication method will now be described by means of the examples below given for illustrative and non-restrictive purposes.

A polytetrafluoroethylene (PTFE) solution polymerised by emulsion with a concentration of 60%, provided by the Sigma-Aldrich Company, is diluted in deionised water to obtain a final mass concentration of 30%.

A heating plate is used to heat the substrate. The substrate is formed by a fuel cell comprising 10 interconnected cells, the cathodic current collector of which is made from porous metal.

Deposition is performed by spraying.

Figure 4:
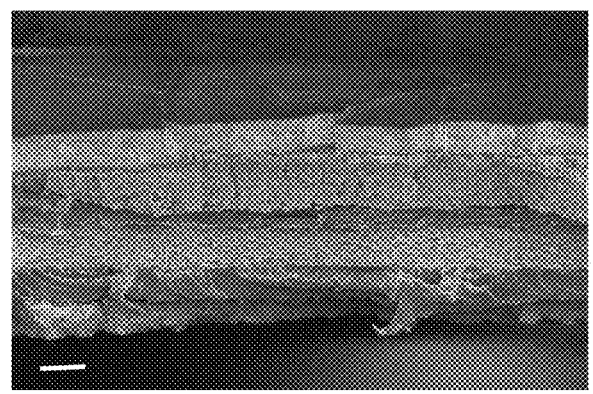
FIG. 4 represents a snapshot obtained by scanning electron microscope of a porous thin layer of PTFE, seen in cross-section, according to a particular embodiment of the invention; the scale represents 10 μm.

After quick drying (1 minute at 130° C.), a porous lattice formed by and advantageously constituted by PTFE particles with a dimension comprised between 150 nm and 350 nm and bonded to one another by PTFE wires with a diameter of about 1 nm and with a length of a few microns is obtained (FIG. 3). FIG. 4 represents a cross-sectional view of the thin layer obtained.

The contact angle measured on the hydrophobic thin layer, represented in FIG. 3, is about 140°, which confirms the hydrophobic nature of the thin layer.

In order to compare the performances of the fuel cell provided with a porous thin layer, two comparative samples were prepared.

The first sample is a fuel cell not provided with a hydrophobic layer. The second sample is a fuel cell provided with a microporous layer obtained by drawing of PTFE (pore size: 4 µm, thickness 190 µm).

Figure 5:
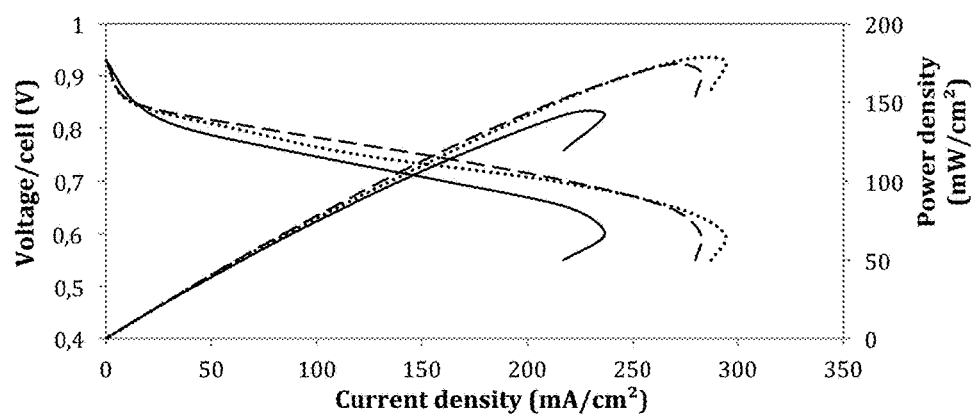
FIG. 5 represents plots of bias curves obtained for different fuel cells: a fuel cell not provided with a porous thin layer of PTFE (unbroken line plot), a fuel cell provided with a thin layer of PTFE obtained by drawing (broken line plot), and a fuel cell provided with a thin layer of PTFE obtained by spray deposition (dotted line plot)

FIG. 5 represents the quasi-static bias curve plot for the different samples. The measurements were made at the end of a 30 min plateau for each potential. The performances obtained with a microporous layer and with a porous thin layer according to the method of the invention are similar.

The performances of cells provided with a hydrophobic layer are higher than those of a cell devoid of a hydrophobic layer.

Figure 6:
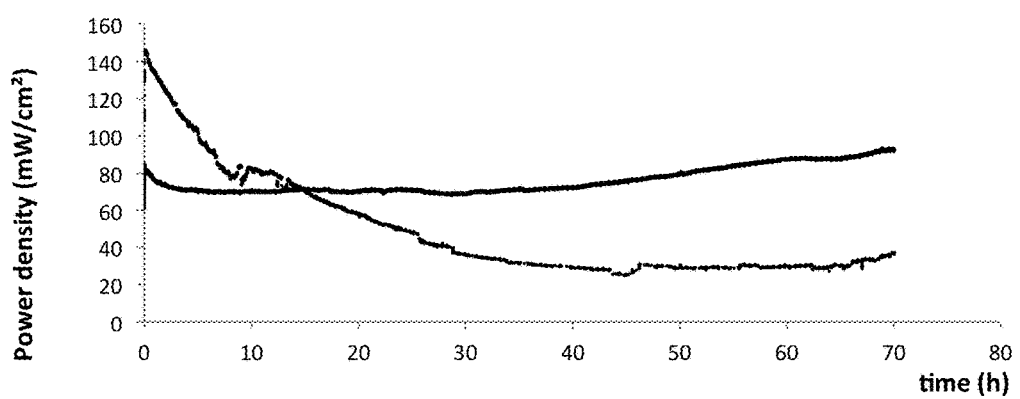
FIG. 6 represents the performances versus time, at a voltage of 0.7V/cell, of different fuel cells: a fuel cell provided with a thin layer of PTFE obtained by drawing (unbroken line plot), a fuel cell provided with a thin layer of PTFE obtained by spray deposition (dotted line plot).

On the other hand, during continuous operation at 0.7V/cell (FIG. 6), the fuel cell having the porous thin layer according to the invention does not deteriorate: its performances increase in the course of time, unlike the fuel cell with water management performed by a microporous layer.

The latter, although it enables good performances to be quickly obtained, subsequently leads to critical flooding on account of the condensation occurring between the cathodic collector and the membrane.

Flooding, connected with the accumulation of liquid water, is prevented with deposition by spraying, in particular on account of the direct contact between this layer and the water production area.

The porous thin layer of fluoropolymer is used as hydrophobic layer, as water management layer, in a fuel cell.

The deposited porous thin layer of fluoropolymer acts as check valve enhancing the expulsion of water in vapour form but not allowing water to return to the cathode in liquid form.

The invention claimed is:

1. Fabrication method of a fuel cell comprising the following successive steps:
    providing a substrate comprising:
        at least one membrane-electrode assembly, formed by an electrolytic membrane arranged between a first electrode and a second electrode,
        a first current collector arranged on the first electrode,
    depositing a fluoropolymer solution on the first current collector,
    making a solvent of the fluoropolymer solution evaporate so as to form a porous thin layer of fluoropolymer.

2. Method according to claim 1, wherein the fluoropolymer is chosen from polytetrafluoroethylene, fluorinated ethylene propylene, ethylene tetrafluoroethylene and perfluoroalkoxy.

3. Method according to claim 1, wherein the fluoropolymer solution is deposited by screen-printing, by inkjet or by spraying.

4. Method according to claim 1, wherein deposition of the fluoropolymer solution is performed at a temperature of less than 130° C.

5. Method according to claim 1, wherein the fluoropolymer solution has a mass concentration of fluoropolymer comprised between 10% and 60%, or between 20% and 40%.

6. Method according to claim 1, wherein hydrophilic charges are added to the fluoropolymer solution.

7. Method according to claim 1, wherein the porous thin layer of fluoropolymer has pores presenting dimensions ranging from 100 nm to 1 µm.

8. Method according to claim 1, wherein the porous thin layer of fluoropolymer is formed by fluoropolymer particles having a diameter ranging from 150 nm to 350 nm.

9. Method according to claim 8, wherein the fluoropolymer particles are bonded to one another by fluoropolymer wires having a length ranging from 1 µm to 10 µm.

10. Method according to claim 9, wherein the fluoropolymer wires present a diameter of less than 100 nm.

11. Method according to claim 1, wherein the first current collector comprises at least one porous area.

12. Method according to claim 1, wherein several thin layers of fluoropolymer are formed on the first current collector.

13. Method according to claim 1, wherein the first electrode is a cathode and wherein the fuel cell is a proton exchange membrane fuel cell.

* * * * *